United States Patent
Gehr et al.

[11] Patent Number: 5,958,179
[45] Date of Patent: Sep. 28, 1999

[54] PROCESS FOR INCREASING PULP WHITENESS BY BLEACHING PRINTED WASTEPAPER UNDER INTENSE DISPERSING MECHANICAL TREATMENT

[75] Inventors: Volker Gehr, Baienfurt; Harald Selder, Schlier, both of Germany

[73] Assignee: Voith Sulzer Stoffaubereitung GmbH, Ravensburg, Germany

[21] Appl. No.: 08/834,482

[22] Filed: Apr. 11, 1997

[30] Foreign Application Priority Data

Apr. 16, 1996 [DE] Germany ............... 196 14 947

[51] Int. Cl.⁶ ............... D21C 5/02; D21B 1/32
[52] U.S. Cl. ............... 162/6; 162/56
[58] Field of Search ............... 162/4, 5, 6, 55, 162/56, 57

[56] References Cited

U.S. PATENT DOCUMENTS

| | | | |
|---|---|---|---|
| 4,909,900 | 3/1990 | Matzke et al. | 162/4 |
| 5,211,809 | 5/1993 | Naddeo et al. | 162/6 |
| 5,518,580 | 5/1996 | Ortner et al. | 162/4 |

FOREIGN PATENT DOCUMENTS

| | | |
|---|---|---|
| 557651 | 9/1993 | European Pat. Off. . |
| 590626 | 4/1994 | European Pat. Off. . |
| 4133683 | 3/1993 | Germany . |
| 94 034949 | 4/1996 | Sweden . |
| 8705346 | 9/1987 | WIPO . |
| 9528517 | 10/1995 | WIPO . |
| 9612062 | 4/1996 | WIPO . |

OTHER PUBLICATIONS

European Search Report and Annex.
Don McBride, "Separate Pulping . . . Benefits", Paper Recycling Strategies, Economics, and Technology, pp. 100–104, 1992.

*Primary Examiner*—Dean T. Nguyen
*Attorney, Agent, or Firm*—Greenblum & Bernstein P.L.C.

[57] ABSTRACT

A process for increasing a degree of whiteness of paper pulp may include bring paper fiber pulp, which may at least partially include printed waste paper, into a suspension with water. The suspension may be mixed with bleaching aids and bleaching chemicals. The bleaching chemicals may preferably contain molecular oxygen. Intensely mechanically treating the pulp, e.g., at at least 20 kWh/to, prior to bleaching the pulp suspension. The bleaching period may take at least 10 minutes, with a pressure above the atmospheric pressure being exerted during the bleaching. After bleaching, a major portion of remaining color print particles may be removed from the bleached pulp.

37 Claims, 3 Drawing Sheets

PROCESS FOR INCREASING PULP WHITENESS BY BLEACHING PRINTED WASTEPAPER UNDER INTENSE DISPERSING MECHANICAL TREATMENT

CROSS REFERENCE TO RELATED APPLICATIONS

The present application claims priority under 35 U.S.C. §119 of German Patent Application No. DE 196 14 947.9, filed on Apr. 16, 1996, the disclosure of which is expressly incorporated herein by reference in its entirety.

BACKGROUND OF THE INVENTION

1. Field of the Invention

The present invention relates to a process for increasing a degree of whiteness of paper fibers produced, at least in part, from printed waste paper. The process may include producing a suspension from paper pulp and water, blending bleaching aids into the suspension, adding bleaching chemicals. The process may also include intensely mechanically treating the paper pulp with a predetermined specific work, bleaching according to predetermined conditions, and removing a major portion of the color print particles separated from the fibers.

2. Discussion of the Background Information

A process similar in general to the present invention is discussed, e.g., in EP 0 557 651 A1. In this document, the process is applied to treatment of mixed waste paper. The waste paper is dissolved using NaOH and NaOCl, and subsequently undergoes conventional cleaning steps. After further thickening the waste paper is treated at a raised temperature with molecular oxygen and peroxide to release oxygen-containing radicals. This process triggers commonly known chemical reactions, in which lignin, in particular, is released from the fiber. After expulsion from the pressure chamber, the pulp is washed. The lignin, brought into solution, is removed with cleaning water. A degree of whiteness can and should be increased through such a process, i.e., the paper produced by the process should be as white as possible, even if it was recovered from printed waste paper.

In SE 94 034 949 A, a process for bleaching secondary fibrous material is illustrated. In this process, the waste paper is subjected to either a single or multiple step de-inking process, and remaining print color particles are later broken up so efficiently in a dispergator that they do not lower the quality of the paper produced. The dispergator also is increases the chances of the bleaching agents attacking the remaining ink particles. A satisfactory whiteness can be achieved in this process only if bleaching agents having relatively aggressive natures and predetermined concentrations are used. However, this leads to high bleaching material costs and could result in lower fiber quality.

A waste paper bleaching process that utilizes elementary oxygen is mentioned in, e.g., U.S. Pat. No. 5,211,809. However, the process operates exclusively through intense chemical treatment of the pulp by using a targeted chemical reaction between the contained ink materials and oxygen. In a pure chemical attack, the degree of whiteness is supposed to be raised by ink material destruction. Thus, a high degree of alkalinity is preferred in this process.

SUMMARY OF THE INVENTION

An object of the present invention is to create a process in which the degree of whiteness may be substantially raised in relation to the prior art processes. Further, the present invention improves the processing of printed, and especially mixed, waste paper into white and mottle-free paper. In accordance with this object, the recovery of fibrous pulp should be as high as possible and the waste water load as low as possible.

In accordance with the present invention, oxidizing bleaching chemicals (agents), e.g., peroxide, oxygen-gas, and oxygen-containing air, and bleaching aids, e.g., NaOH, $MgSO_4$, $Na_2SiO_3$, may be utilized. Bleaching agents and bleaching aids are often utilized in combination for bleach treatments, e.g., peroxide and molecular oxygen. Alternatively, stabilizing bleaching aid chemicals, e.g., $Na_2SiO_3$, can be utilized first and NaOH can be added afterwards.

A combination of intense mechanical treatment of the fibrous pulp with oxidizing bleach under certain prescribed parameters has proven particularly advantageous. Such mechanical pre-treatment, in either one or two steps, optimally prepares the fibrous pulp for the application of oxidizing reagents. Mechanical pre-treatment can also improve mixing of the fibrous pulp with the bleaching aids and, if applicable, with the bleaching chemicals. An increased degree of whiteness and improved cleanness may be achieved through a combination of dispersing and either $O_2$ or $O_2$+peroxide bleach, especially if flotation or washing occurs afterwards. As a result, chemicals can be conserved and bleaching process conditions may be adjusted to preserve the fiber without sacrificing whiteness. Further, because less dissolved pulp accumulates in the bleaching process or in subsequent separation steps, the load on the waste water may also be reduced. While the use of pure oxygen produces outstanding results, a gas mixture of inert gas and oxygen, e.g. air, especially at a raised pressure, may satisfactorily accomplish this task and, thus, may be an economical compromise. In addition to the clear cost savings over pure oxygen, using a gas mixture reduces the risk of explosion.

A combination of two mechanical treatment steps in conjunction with the described bleaching treatment may particularly useful in performing the present invention. Such a combination makes it possible, for example, to mix bleaching aids, during the first mechanical treatment, at a strength sufficient to distribute them well, but without risking the yellowing of wood-containing particles in the waste paper due to delignification occurring at this stage of the process. After the optimal mixing occurs, a subsequent intense mechanical treatment may provide the possibility of mixing in gaseous oxygen or an oxygen-containing gas, so that the bleaching effect immediately and optimally occurs.

Accordingly, the present invention may be directed to a process for increasing a degree of whiteness of paper pulp. The paper pulp may include printed waste paper and the process may include producing a suspension including the paper pulp and water, blending bleaching aids into the suspension, adding bleaching chemicals to the suspension, dispersing the paper pulp within the suspension, with intense mechanical treatment at a specific work of at least approximately 20 kWh/to (kilowatt-hour/metric ton), to one of a pulp density greater than approximately 15% and a pulp temperature above approximately 40° C., bleaching the paper pulp under a pressure of at least approximately one bar for at least approximately ten minutes, and removing a major portion of color print particles separated from the paper pulp.

In accordance with another feature of the present invention, the bleaching may further include maintaining a solids concentration between approximately 15 and 40%.

In accordance with another feature of the present invention, the intense mechanical treatment may occur at a specific work of at least approximately 40 kWh/to.

In accordance with still another feature of the present invention, the bleaching may further include at least approximately 20% of the pressure including an oxygen partial pressure. Further, the pressure may be at least approximately 2.5 bar.

In accordance with a further feature of the present invention, the bleaching may further include at least approximately 90% of the pressure including an oxygen partial pressure.

In accordance with a still further feature of the present invention, the bleaching may further include maintaining a temperature of between approximately 40 and 140° C.

In accordance with still another feature of the present invention, the dispersing may further include maintaining a total pressure of at least approximately 1 bar. Further, the dispersing may further include a pulp temperature greater than approximately 100° C. Further, the pulp temperature may be at least approximately 120° C. Still further, the dispersing may further include maintaining a total pressure of at least approximately 2.5 bar.

In accordance with yet another feature of the present invention, the dispersing may include operating conditions corresponding to operating conditions of the bleaching.

In accordance with a still further feature of the present is invention, the process may also include locating the intensive mechanical treatment of the paper pulp and the bleaching within a same machine housing.

In accordance with a further feature of the present invention, the process may further include adding air having at least approximately 20% molecular oxygen to adjust and maintain the bleaching.

In accordance with still another feature of the present invention, the process may further include adding gas having at least approximately 90% molecular oxygen to adjust and maintain the bleaching.

In accordance with a further feature of the present invention, the process may further include adding a first portion of bleaching chemicals after producing the suspension and before dispersing the paper pulp and adding a second portion of bleaching chemicals during bleaching. Further, the first portion of bleaching chemicals may include peroxide and the second portion of the bleaching chemicals may include gaseous oxygen.

In accordance with another feature of the present invention, the process may further include adding the bleaching aids to an already thickened fibrous pulp of at least approximately 10% pulp density. Further, the intense mechanical treatment of the paper pulp may occur within a dispergator and the process may further include adding the bleaching aids at one of inside the dispergator and immediately before the paper pulp enters the dispergator, and mixing the bleaching aids with the paper pulp within the dispergator.

In accordance with another feature of the present invention, the process may further include pre-cleaning the suspension immediately after producing the suspension. The pre-cleaning may be based upon at least one of variable size, variable density, and variable wettability of the paper pulp. Further, the process may also include partially removing color particles in the pre-cleaning.

In accordance with still another feature of the present invention, the process may further include mechanically pre-treating the paper pulp, before the dispersing, at a specific work transfer of at least approximately 10 kWh/to. Further, the process may further include adding bleaching aids at one of during and immediately before mechanically pre-treating the paper pulp.

In accordance with a further feature of the present invention, the mechanical pre-treating may include an operating pressure of at least approximately atmospheric pressure and the intense mechanical treatment comprising an operating pressure of at least approximately 2.5 bar.

In accordance with a still further feature of the present invention, the process may further include mechanically post-treating the paper pulp, after dispersing, at a specific work transfer of at least approximately 20 kWh/to. Further, the mechanical treatment may include an operating pressure of at least approximately 2.5 bar and the mechanical post-treating may include an operating pressure of at least approximately atmospheric pressure.

In accordance with still another feature of the present invention, the removing may include de-inking flotation at a pulp density less than approximately 2.5%.

In accordance with another feature of the present invention, the removing may include de-inking washing with a portion of the water.

In accordance with yet another feature of the present invention, the process may further include second bleaching the paper pulp after removal of the major portion of the print color particles. Further, the process may include adding reducing chemicals during second bleaching.

The present invention may be directed to a process for increasing a degree of whiteness of paper pulp that includes printed waste paper. The process may include producing a suspension including the paper pulp, transferring a specific work to the paper pulp through intense mechanical treatment, bleaching the paper pulp with bleaching aids and bleaching chemicals added to the paper pulp, and removing a portion of print color particles separated from the paper pulp. The adding of the bleaching aids and bleaching chemicals may include adding bleaching aids at at least one of during producing of the suspension, during transferring of the specific work, and between the producing of the suspension and the transferring of the specific work, and adding bleaching chemicals at at least one of during transferring of the specific work and during the bleaching.

In accordance with another feature of the present invention, the process may further include pre-cleaning the produced suspension and removing a portion of the print color particles separated from the suspension by the pre-cleaning.

In accordance with another feature of the present invention, transferring a specific work may include pre-treating the paper pulp by transferring a specific work of at least approximately 10 kWh/to and treating the paper pulp by transferring a specific work of at least approximately 20 kWh/to. Further, the process may also include adding bleaching aids during one of prior to and during the pre-treating, and adding bleaching chemicals during one of treating and bleaching.

In accordance with still another feature of the present invention, the process may further include treating the paper pulp, after bleaching, with intense mechanical treatment.

In accordance with yet another feature of the present invention, the process may further include adding reducing bleaching chemicals to a remaining suspension after removal of the print color particles.

Further embodiments and advantages can be seen from the detailed description of the present invention and the accompanying figures.

BRIEF DESCRIPTION OF DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Figure 1:
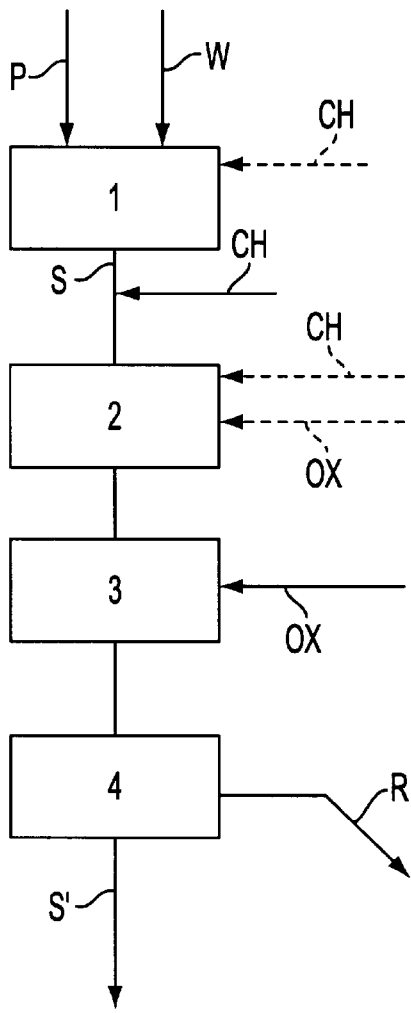
FIG. 1 illustrates an exemplary flow diagram of the general process according to the present invention.

FIG. 1 illustrates an exemplary flow diagram of the present invention, which may include four fundamental steps, e.g., producing 1 a suspension S, e.g., paper pulp P and water W, intense mechanical treatment 2 of the suspension, i.e., a dispersing process, bleaching 3 the treated suspension, and removal 4 of a major portion of print color particles that have been separated from the fibers, i.e., via de-inking. The printed color particles may be accumulated as reject product R and may be removed from the process. During the intense mechanical treatment 2, a specific work of at least approximately 20 kWh/to may be transferred to the suspension by a high-consistency kneading machine or pulp dispersing device (e.g., a dispergator, not shown). However, it is noted that in many instances, a higher specific work rate, e.g., approximately 40 kWh/to, may be advantageous. Bleaching aids CH may be mixed into the process, preferably prior to intense mechanical treatment 2, to ensure sufficient blending of bleaching aids CH and suspension S. Adding bleaching aids CH to pulp already thickened for mechanical treatment may be particularly economical. Further, the addition of bleaching aids CH to hot or heated pulp, if heating of the pulp is necessary, may be particularly advantageous. Alternatively, it may be equally conceivable to add bleaching aids CH during dissolution of paper pulp P, thus, increasing the exposure time.

With regard to bleaching agents OX, it is generally known that some of the materials used as bleaching agents OX may not be very stable chemically. Accordingly, the present invention strives for a short time period between addition of bleaching agents OX and the actual bleaching process. However, mixing bleaching chemicals with the material during mechanical treatment stage 2 may be particularly effective. Therefore, it is up to the practitioner to determine, after considering all of the factors, where in the process to add the bleaching chemicals to obtain an optimal result. For example, peroxide may be added as bleaching agent even before the dispersing process. However, if molecular oxygen is used, an addition directly into a bleaching apparatus, e.g., a bleaching tower, may be advisable. A bleaching tower may include a device in which the material to be bleached is given a specific exposure time and may be stacked in accordance with the bleaching requirements. Further, pure oxygen and oxygen-containing gas, e.g. air, which may have between approximately 20% and 90% oxygen, may be utilized for bleaching 3. The pressure and temperature requirements for bleaching 3 may depend, e.g., on a concentration of the gas used.

After paper pulp P or suspension S undergoes the abovenoted four fundamental process steps, a bleached and cleaned suspension S' may be directed to a subsequent treatment or processing facility.

Figure 2:
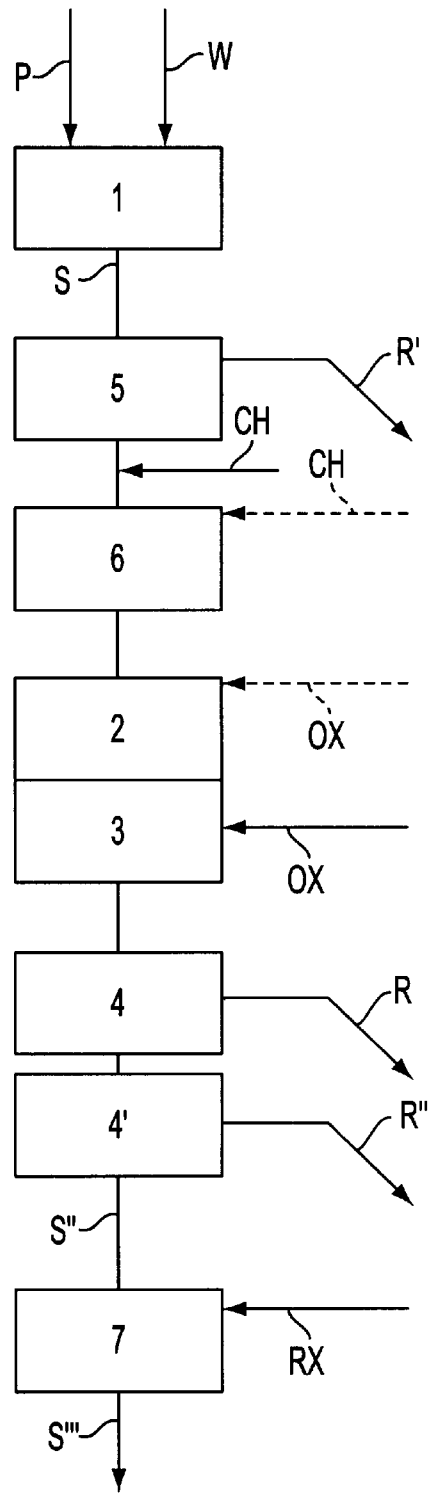
FIG. 2 illustrates an alternative exemplary flow diagram of the process of the present invention.

An alternative exemplary process illustrated in FIG. 2, in contrast to the exemplary flow diagram of FIG. 1, additionally depicts the use of additional steps, e.g., pre-cleaning 5 of the produced suspension S, and mechanical pre-treatment 6 of suspension S. Pre-cleaning of the suspension may be based upon the variable size, variable density, and/or variable wettability of the paper pulp. Pre-treatment 6 may occur with a specific work of, e.g., at least approximately 10 kWh/to and serves, in principle, to homogenize the paper pulp. Pre-treatment 6 may precede intense mechanical treatment 2, in which a specific work of, e.g., at least approximately 20 kWh/to may be transferred to suspension S. The alternative process illustrated in FIG. 2 may also include, e.g., a two-step removal 4 and 4' for removing print color particles. These removal steps may include, e.g., two flotation processes connected in series or a combination of a flotation and a cleaning process. Removal 4' may be a de-inking flotation device that removes print color particles from a suspension comprising pulp density, e.g., less than approximately 2.5%. The principle mentioned above with regard to FIG. 1 may also apply with respect to the addition of bleaching chemicals to the alternative process of FIG. 2. As depicted in the flow diagram, it is shown that reject products R, R', and R" may be diverted from removal 4, pre-cleaning 5, and removal 4', respectfully. Further, suspension S", produced from removal 4', may be treated and/or improved with an additional process, i.e., reducing bleaching treatment 7. In accordance with the present invention, reducing bleaching treatment 7 may utilize addition of chemicals RX. As shown in FIG. 2, a suspension S'" may be produced from reducing bleaching treatment 7, which may be a high-quality paper pulp. The capital expenditure for the process may depend upon, e.g., the finished product requirements and/or the quality of waste paper entering the process.

Figure 3:
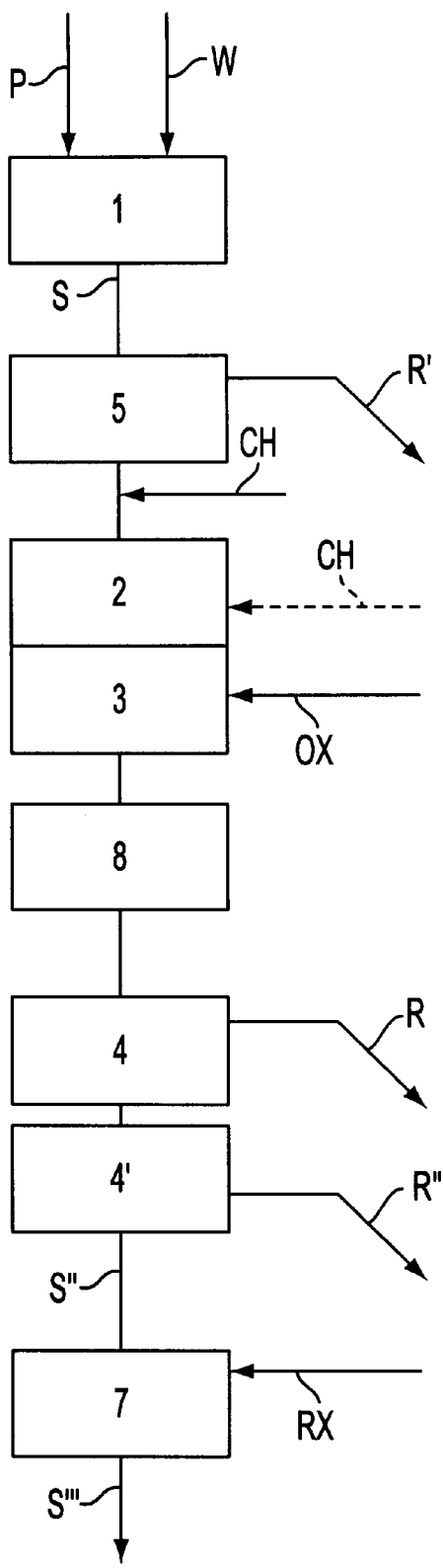
FIG. 3 illustrates another alterative exemplary flow diagram of the process of the present invention.

According to another alternative process to the exemplary flow diagram of FIG. 1, FIG. 3 does not utilize mechanical pre-treatment 6 depicted in FIG. 2, but instead utilizes (8) a dispersing treatment 8, e.g., in another pulp dispersing device (e.g., a dispergator), occurring after bleaching 3 and prior to removal 4. As is known in the art, a dispergator generally operates to produce very high shear forces to homogenize the bleached pulp. The dispersing treatment of the present invention may be utilized to sufficiently prepare the pulp for subsequent removal of print color particles. Any adhesive forces between the color particles and the fiber able to withstand intense mechanical treatment 2 may be destabilized via chemical attack in bleaching treatment 3. The shear forces exhibited or occurring within the dispergator may be especially suitable for separating well-adhered color particles from the fibers.

Figure 4:
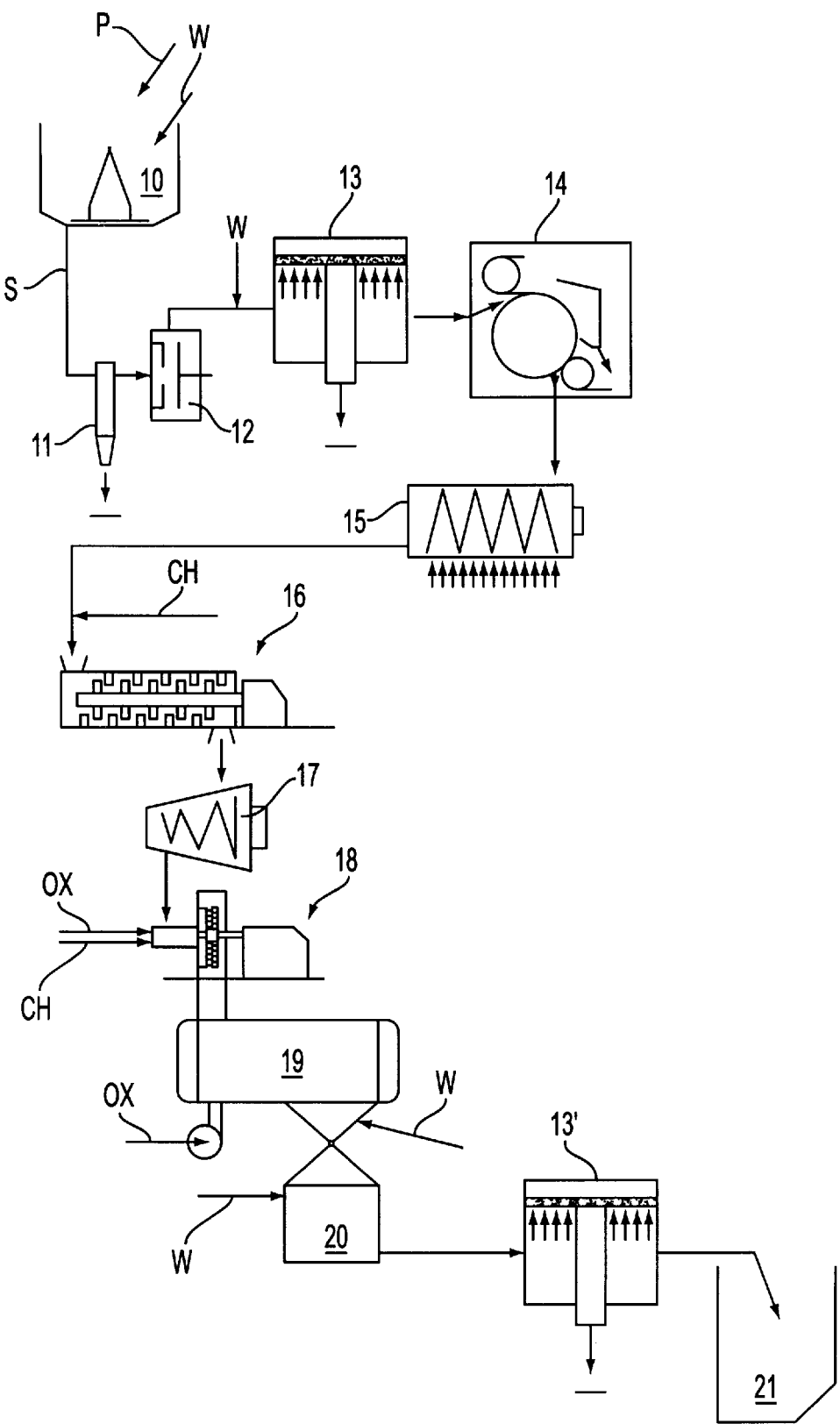
FIG. 4 illustrates an exemplary system utilizing the process of the present invention.

FIG. 4 illustrates a facility that may utilize the process according to the present invention. Paper pulp P and water W may be dissolved in a high-consistency-pulp-dissolving device 10. The mixture may be diluted so that a suspension S suitable for pumping may be formed. Suspension S may be subsequently treated in a hydro-cyclone 11 and a deflaker 12. Additional water W may be added to a flotation device 13 to obtain a predetermined consistency. Printing ink and additional particulate impurities may be separated out of the pulp via flotation device 13, i.e. a de-inking process step is performed. The cleaned target material output from flotation device 13 may be forwarded to a thickening device 14. Thickening device 14 may be utilized to output a pulp thickness of, e.g., at least approximately 15%, and preferably between approximately 15 and 40%. The high-consistency pulp produced in thickening device 14 may be raised to a predetermined temperature, e.g., greater than 40° C., and preferably greater than approximately 100° C. in a heat exchanger 15, e.g., utilizing steam injection. The high-consistency heated pulp may be fed into a kneader 16 that performs a mechanical pre-treatment on the paper pulp. Bleaching aids CH may preferably be mixed into the pulp immediately before it enters kneader 16. Kneader 16 may be pressurized or not. If kneader 16 is not pressurized, which has particular advantages in the present invention, the pulp may be subsequently fed through a compression device 17 to a pressurized dispersing device 18. Dispersing device 18 may be maintained at a pressure of, e.g., greater than approximately 1 bar, and preferably greater than approximately 2.5 bar.

While a combination of unpressurized kneader 16 and highly pressurized dispersing device 18 may be costly, it may be particularly effective for executing the process. In other similar type facilities, mechanical pre-treatment may occur in the kneading device. In addition, dispersing device 18 does not necessarily have to be pressurized. Bleaching chemicals OX may be added to the pulp at least in part before the pulp reaches dispersing device 18. Under certain circumstances, a portion of bleaching aids CH may also be added at this location. Thus, actual bleaching may occur within bleaching vessel 19. Bleaching vessel 19 may be pressurized, e.g., at greater than approximately 1 bar, and preferably greater than 2.5 bar, according to the present invention, and at least a portion of the bleaching chemicals OX may be added to bleaching vessel 19. This arrangement is particularly beneficial if bleaching chemicals OX are in gaseous form. For example, between approximately 20 and 90% of the total pressure may be due to an oxygen partial pressure. Further, during bleaching 3, the process may maintain a temperature of, e.g., between approximately 40° C. and 140° C. After the pulp has remained in bleaching vessel 19 for at least 10 minutes, it can be released through a sluice to a dilution vessel 20. Afterwards another de-inking flotation, e.g., in flotation device 13' may occurs. The pulp may again be cleaned of separated impurities by flotation. The pulp may then reach a storage tub 21.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. For example, the above-described facility may illustrate only one possible arrangement for performing the process of the present invention. However, the ordinarily skilled artisan, through the teachings of the present invention, may provide further devices and/or arrangements for carrying out the disclosed features and processes of the present invention.

What is claimed:

1. A process for increasing a degree of whiteness of paper pulp, the paper pulp including printed waste paper in which print includes color print particles, the process comprising:

producing a suspension including the paper pulp and water;

blending bleaching aids into the suspension;

adding bleaching chemicals to the suspension;

bleaching said suspension under a pressure of at least approximately one bar for at least approximately ten minutes;

subjecting said suspension, either prior to or during or after said bleaching, to an intense dispersing mechanical treatment at a specific work of at least approximately 20 kWh/to, to a pulp consistency greater than approximately 15% and a pulp temperature above approximately 40° C.; and removing a major portion of print color particles separated from said suspension.

2. The process according to claim 1, the bleaching further comprising maintaining a solids concentration between approximately 15 and 40%.

3. The process according to claim 1, the intense dispersing mechanical treatment having a specific work of at least approximately 40 kWh/to.

4. The process according to claim 1, the bleaching further comprising at least approximately 20% of the pressure comprising an oxygen partial pressure.

5. The process according to claim 4, the pressure being at least approximately 2.5 bar.

6. The process according to claim 1, the bleaching further comprising at least approximately 90% of the pressure comprising an oxygen partial pressure.

7. The process according to claim 1, the bleaching further comprising maintaining a temperature of between approximately 40 and 140° C.

8. The process according to claim 1, the intense dispersing mechanical treatment further comprising maintaining a total pressure of at least approximately 1 bar.

9. The process according to claim 8, the intense dispersing mechanical treatment further comprising a pulp temperature greater than approximately 100° C.

10. The process according to claim 8, the intense dispersing mechanical treatment further comprising maintaining a total pressure of at least approximately 2.5 bar.

11. The process according to claim 10, the intense dispersing mechanical treatment further comprising a pulp temperature of at least approximately 120° C.

12. The process according to claims 1, the intense dispersing mechanical treatment comprising operating under conditions corresponding to operating conditions of the bleaching.

13. The process according to claim 12, further comprising locating the intense dispersing mechanical treatment of said suspension and the bleaching within a same machine housing.

14. The process according to claim 1, further comprising adding air comprising at least approximately 20% molecular oxygen to adjust and maintain the bleaching.

15. The process according to claim 1, further comprising adding gas comprising at least approximately 90% molecular oxygen to adjust and maintain the bleaching.

16. The process according to claim 1, further comprising:
    adding a first portion of bleaching chemicals after producing the suspension and before the intense dispersing mechanical treatment of said suspension; and
    adding a second portion of bleaching chemicals during bleaching.

17. The process according to claim 16, the first portion of bleaching chemicals comprising peroxide.

18. The process according to claim 16, the second portion of the bleaching chemicals comprising gaseous oxygen.

19. The process according to claim 1, wherein blending the bleaching aids comprises adding the bleaching aids to an already thickened fibrous pulp of at least approximately 10% pulp consistency.

20. The process according to claim 19, wherein the intense dispersing mechanical treatment of said suspension occurs within a dispergator, the process further includes:
    adding the bleaching aids at one of inside the dispergator and immediately before said suspension enters the dispergator; and
    mixing the bleaching aids with said suspension within the dispergator.

21. The process according to claim 1, further comprising:
    pre-cleaning the suspension immediately after producing the suspension,
    wherein the pre-cleaning based upon at least one of variable size, variable consistency, and variable wettability of the paper pulp.

22. The process according to claim 21, further comprising partially removing print color particles in the pre-cleaning.

23. The process according to claim 1, further comprising mechanically pre-treating the paper pulp, before the intense dispersing mechanical treatment, at a specific work transfer of at least approximately 10 kWh/to.

24. The process according to claim 23, further comprising adding bleaching aids at one of during and immediately before mechanically pre-treating the paper pulp.

25. The process according to claim 23, the mechanical pre-treating comprising an operating pressure of at least approximately atmospheric pressure and the intense dispersing mechanical treatment comprising an operating pressure of at least approximately 2.5 bar.

26. The process according to claim 1, further comprising mechanically post-treating said suspension, after the intense dispersing mechanical treatment, at a specific work transfer of at least approximately 20 kWh/to.

27. The process according to claim 26, the intense dispersing mechanical treatment comprising an operating pressure of at least approximately 2.5 bar and the mechanical post-treating comprising an operating pressure of at least approximately atmospheric pressure.

28. The process according to claim 1, the removing comprising de-inking flotation at a pulp consistency less than approximately 2.5%.

29. The process according to claim 1, the removing comprising de-inking washing with a portion of the water.

30. The process according to claim 1, further comprising second bleaching said suspension after removal of the major portion of the print color particles.

31. The process according to claim 30, further comprising adding reducing chemicals during second bleaching.

32. A process for increasing a degree of whiteness of paper pulp including printed waste paper in which print includes color print particles, the process comprising:
    producing a suspension comprising the paper pulp;
    bleaching said suspension with bleaching aids and bleaching chemicals added to said suspension;
    subjecting said suspension, either prior to or during or after said bleaching, to an intense dispersing mechanical treatment at a specific work of at least approximately 20 kWh/to;
    removing a portion of print color particles separated from said suspension; and
    the adding of the bleaching aids and bleaching chemicals comprising:
        adding bleaching aids at at least one of during producing of the suspension, during subjecting of said suspension to the specific work, and between the producing of the suspension and the subjecting of said suspension to the specific work; and
        adding bleaching chemicals at at least one of during subjecting of said suspension to the specific work and during the bleaching.

33. The process according to claim 32, further comprising:
    pre-cleaning the produced suspension; and
    removing a portion of the print color particles separated from the suspension by the pre-cleaning.

34. The process according to claim 32, further comprising:
    pre-treating the paper pulp by transferring a specific work of at least approximately 10 kWh/to.

35. The process according to claim 34, adding bleaching aids during one of prior to and during the pre-treating; and
    adding bleaching chemicals during one of treating and bleaching.

36. The process according to claim 32, further comprising treating said suspension, after bleaching, with the intense dispersing mechanical treatment.

37. The process according to claim 32, further comprising adding reducing bleaching chemicals to a remaining suspension after removal of the print color particles.

* * * * *